UNITED STATES PATENT OFFICE.

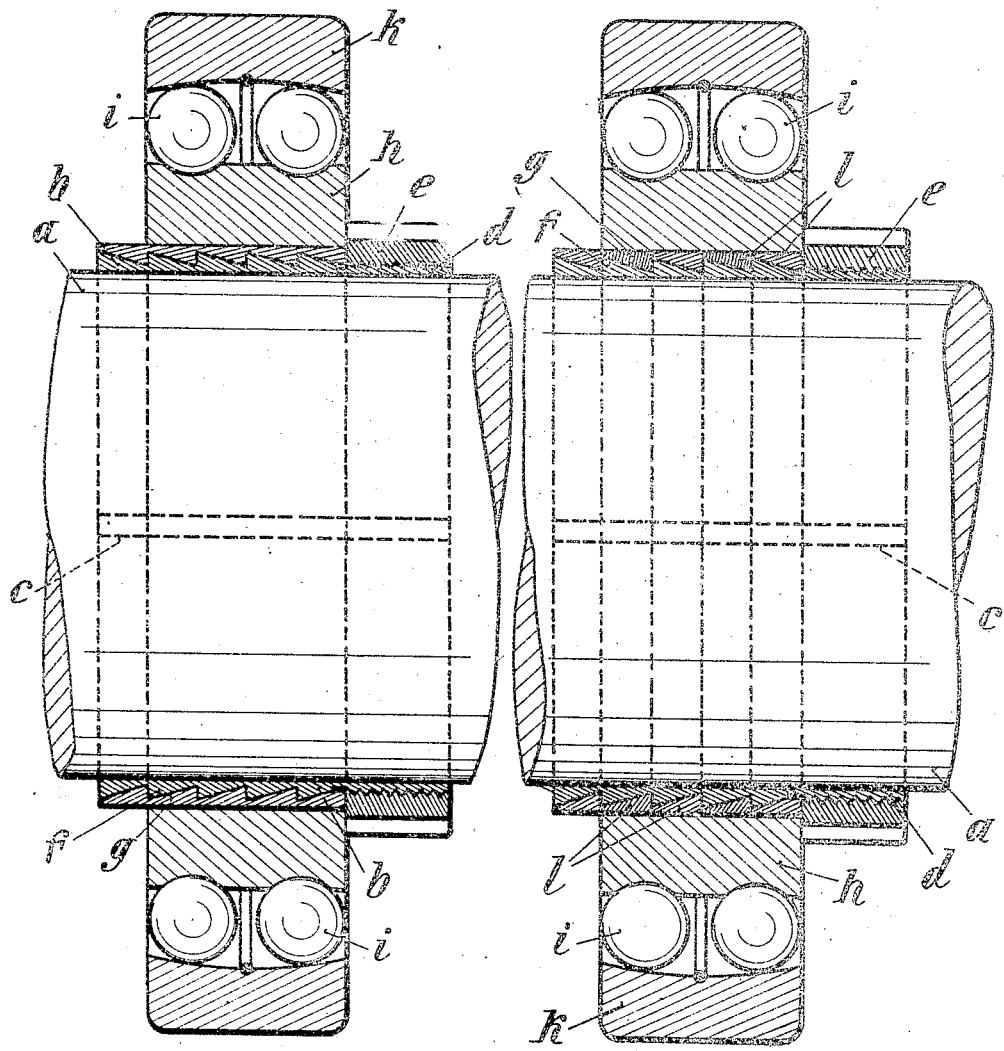

JOSEF VORRABER, OF MUNICH-TRUDERING, GERMANY.

CLAMPING DEVICE FOR BALL-BEARINGS.

1,251,449.  Specification of Letters Patent.  Patented Dec. 25, 1917.

Application filed August 3, 1916. Serial No. 112,955.

*To all whom it may concern:*

Be it known that I, JOSEF VORRABER, of 22 Auerfeldstrasse, Munich-Trudering, Bavaria, Germany, civil engineer, have invented certain new and useful Improvements in Clamping Devices for Ball-Bearings, of which the following is a specification.

My invention relates to clamping devices for ball bearings and its object is to provide a device by means of which standard ball bearings the inner race of which has a cylindrical bore may be clamped on a shaft by a slight axial displacement of a nut. This has the advantage that the casing for the bearing can be made short, little space being required for displacing said nut.

With this object in view, I provide a cylindrical split sleeve on a shaft, said sleeve having preferably a plurality of projections which may be conical, for instance, and a threaded portion, and on such sleeve is arranged a further sleeve, also split, and having preferably a plurality of recesses corresponding to the projections of the inner sleeve. The outside of this outer sleeve is cylindrical, and to it is fitted the inner race of a ball bearing. By displacing the nut on the threaded portion of the inner sleeve, an axial thrust may be exerted on the outer sleeve which causes the two sets of coöperating projections and recesses in the sleeves to become displaced relatively to each other. As the outer sleeve is unable to expand, being held by the inner ball race fitted on it, the inner sleeve will be compressed and firmly clamped on its shaft.

The pitch of the said projections and recesses being considerable, a strong clamping action is effected by a comparatively short relative displacement of the two sleeves which is an advantage of my invention as compared with the well known clamping sleeves for cylindrically bored radial ball bearings.

Instead of providing an outer sleeve having a series of recesses, I may arrange a plurality of split rings on the projections of the inner sleeve which are adapted to be displaced relatively to them.

Reference is to be had to the accompanying drawings in which I have illustrated two embodiments of my invention by way of example.

Referring to Figure 1, *a* is a shaft on which is arranged an inner sleeve *b* split at *c*. This sleeve has a threaded portion *d* on which is carried a nut *e*, and a plurality of conical projections or faces *f*. An outer sleeve *g*, also split, is placed on the inner sleeve so that the conical recesses with which it is provided engage the conical projections *f* of sleeve *b*. Fitted on this outer sleeve *g* is the inner race *h* of a ball bearing the balls of which are indicated at *i*. *k* is the outer race of the ball bearing.

A very slight modification as illustrated in Fig. 2 is very similar to the one just described, except for the fact that instead of having conical recesses, the outer sleeve is formed by a plurality of split rings *l*, each of which fits one of the conical projections *f* on sleeve *b*.

In both cases, if nut *e* is turned on the threaded portion of sleeve *b*, it will exert an axial thrust on the outer sleeve *g* or the rings *l*, respectively, causing the inner sleeve to become clamped firmly on its shaft *a*.

I claim:

1. In a clamping device for ball bearings, an inner longitudinally split sleeve on a shaft, an outer longitudinally split sleeve on said inner sleeve, said outer sleeve holding the inner race of a ball bearing, said inner sleeve being provided with a plurality of annular, conical projections and said outer sleeve being provided with a plurality of annular, conical recesses adapted to receive said projections, and a nut engaging with the threaded end of the inner sleeve and adapted to coact with the outer sleeve to adjust it longitudinally of the inner sleeve.

2. In a clamping device for ball bearings, an inner split sleeve on a shaft, an outer longitudinally split sleeve on said inner sleeve, said outer sleeve holding the inner race of a ball bearing, means for displacing said sleeves axially in relation to each other, a plurality of annular conical projections on said inner sleeve and conical recesses in said outer sleeve, said recesses fitting said projections.

3. In a clamping device for ball bearings, an inner split sleeve on a shaft, an outer split sleeve on said inner sleeve, said outer sleeve holding the inner race of a ball bearing, a nut on said inner sleeve engaging said outer sleeve, a conical annular projection on said inner sleeve and a conical recess on said outer sleeve, said recess fitting said projection.

4. In a clamping device for ball bearings, an inner split sleeve on a shaft, an outer split sleeve on said inner sleeve, said outer sleeve holding the inner race of a ball bearing, a nut on said inner sleeve engaging said outer sleeve, conical projections on said inner sleeve and conical recesses in said outer sleeve, said recesses fitting said projections.

5. In a clamping device for ball bearings having standard cylindrical bore, an inner split-sleeve on a shaft, an outer split-sleeve on said inner sleeve, said outer sleeve cylindrical at its outer surface and holding the inner race of a ball bearing, means for displacing said sleeves axially in relation to each other, annular, conical projections on one of said sleeves and recesses in the other, fitting said projections.

6. In a clamping device for ball bearings having standard cylindrical bore, an inner split-sleeve on a shaft, an outer split-sleeve on said inner sleeve, said outer sleeve cylindrical at its outer surface and holding the inner race of a ball bearing, means for displacing said sleeves axially in relation to each other, annular conical projections on said inner sleeve and conical recesses in said outer sleeve, said recesses fitting the projections.

In testimony whereof, I affix my signature, in presence of two witnesses.

JOSEF VORRABER.

Witnesses:
W. S. SPUYILBERG,
HARRY SCHMID.